US012564139B1

(12) United States Patent
Janson

(10) Patent No.: US 12,564,139 B1
(45) Date of Patent: Mar. 3, 2026

(54) GEARED LOPPER WITH ADDITIONAL LEVERAGE

(71) Applicant: Paul Janson, Porter Ranch, CA (US)

(72) Inventor: Paul Janson, Porter Ranch, CA (US)

( * ) Notice: Subject to any disclaimer, the term of this patent is extended or adjusted under 35 U.S.C. 154(b) by 132 days.

(21) Appl. No.: 18/831,112

(22) Filed: Jul. 18, 2024

Related U.S. Application Data

(60) Provisional application No. 63/531,078, filed on Aug. 7, 2023.

(51) Int. Cl.
*A01G 3/025* (2006.01)
*B26B 17/02* (2006.01)

(52) U.S. Cl.
CPC ............ *A01G 3/0251* (2013.01); *B26B 17/02* (2013.01)

(58) Field of Classification Search
CPC .............................. B26B 17/02; A01G 3/0251
See application file for complete search history.

(56) References Cited

U.S. PATENT DOCUMENTS

| 107,577 | A | * | 9/1870 | Will | A01G 3/02 30/250 |
| 199,065 | A | * | 1/1878 | Hixson | A01K 17/00 30/243 |
| 248,996 | A | * | 11/1881 | Burdick | B23D 15/145 30/227 |
| 512,086 | A | * | 1/1894 | Ashcraft | B25B 7/14 81/343 |

| 766,941 | A | * | 8/1904 | Eddleman | A01K 17/00 30/243 |
| 863,111 | A | * | 8/1907 | Smohl | B26B 17/02 30/271 |
| 3,372,478 | A | * | 3/1968 | Wallace | A01G 3/0251 30/252 |
| 5,020,222 | A | | 6/1991 | Gosselin et al. | |
| 5,570,510 | A | * | 11/1996 | Linden | B26B 13/28 30/192 |
| 5,689,888 | A | * | 11/1997 | Linden | B26B 13/26 30/192 |
| 6,345,446 | B1 | * | 2/2002 | Huang | A01G 3/0251 30/192 |
| 6,513,248 | B2 | * | 2/2003 | Linden | A01G 3/02 30/190 |
| 6,829,829 | B1 | * | 12/2004 | Huang | A01G 3/0475 30/252 |
| 8,327,549 | B2 | * | 12/2012 | Huang | B26B 13/26 30/190 |
| D693,192 | S | * | 11/2013 | Masalin | D8/52 |
| 9,345,200 | B2 | * | 5/2016 | Cunningham | A01G 3/0251 |
| 9,426,945 | B2 | * | 8/2016 | Hsu | B26B 13/26 |

(Continued)

*Primary Examiner* — Sean M Michalski

(74) *Attorney, Agent, or Firm* — Guy Cumberbatch

(57) ABSTRACT

A geared lopper has a cam lever arm on an upper handle with a fixed rear bracket thereon where the fixed rear bracket is attached onto a hook jaw and the other end has a bolt attachment point; a hook jaw has the bolt attachment point on a stub end and distal from a jaw thereon, said hook jaw is on the front end, a front bracket is attached thereon near the jaw with a pivot between the hook jaw and the front bracket; a cutting blade is attached to the hook jaw near a front bracket through a pivot thereon, a rear pivot on the cutting blade attaches to an only pivot on the gear lever arm; and a gear lever arm is on a lower handle, the rear pivot on the cutting blade attaches to the pivot on the gear lever arm.

10 Claims, 14 Drawing Sheets

(56) References Cited

U.S. PATENT DOCUMENTS

| | | | | |
|---|---|---|---|---|
| 10,212,891 | B1 * | 2/2019 | Wu | ....................... A01G 3/0251 |
| 11,540,449 | B1 * | 1/2023 | Lin | ....................... A01G 3/0475 |
| 12,268,131 | B2 * | 4/2025 | Heine | .................. A01G 3/0251 |
| 12,310,300 | B2 * | 5/2025 | Chan | ..................... A01G 3/0251 |
| 2012/0311872 | A1 * | 12/2012 | Wang | ....................... A01G 3/02 |
| | | | | 30/252 |
| 2014/0215834 | A1 * | 8/2014 | Wang | ..................... A01G 3/021 |
| | | | | 30/251 |

* cited by examiner

Preferred
Embodiment
Front

Perspective
Rear

Cutting blade 12

Bracket 1, 28

Bracket 2, 30

Cam lever
Arm, 18

Gear
lever Arm 20

Hook
Jaw 26

Bracket 1
28

Bracket 2
30

Cam lever
Arm 18

Gear
lever
arm 20

Cutting
blade 12

Hook
Jaw 26

C'Bore
RND HD bolt
top side of
Gear lever arm

C'Bore
RND HD bolt
Back side of
Bracket 1

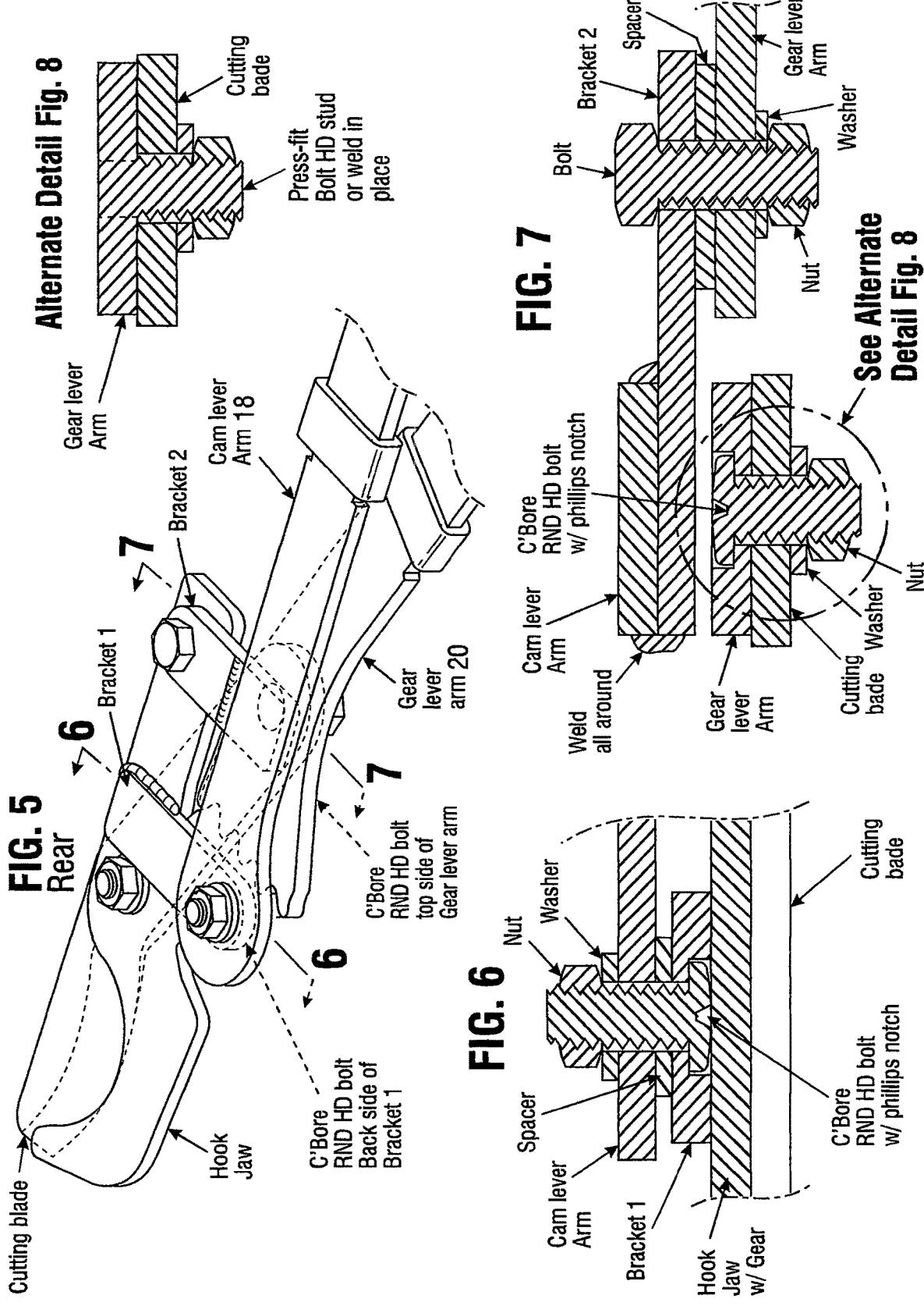

Alternate Detail Fig. 8

Gear lever Arm

Cutting bade

Press-fit Bolt HD stud or weld in place

FIG. 5
Rear

Cutting blade

Bracket 1

Bracket 2

Cam lever Arm 18

Gear lever arm 20

Hook Jaw

C'Bore RND HD bolt Back side of Bracket 1

C'Bore RND HD bolt top side of Gear lever arm

FIG. 7

Spacer

Gear lever Arm

Bracket 2

Bolt

Washer

Nut

Cam lever Arm

C'Bore RND HD bolt w/ phillips notch

Weld all around

Gear lever Arm

Cutting bade

Washer

Nut

See Alternate Detail Fig. 8

FIG. 6

Nut

Washer

Spacer

Cam lever Arm

Bracket 1

Hook Jaw w/ Gear

C'Bore RND HD bolt w/ phillips notch

Cutting bade

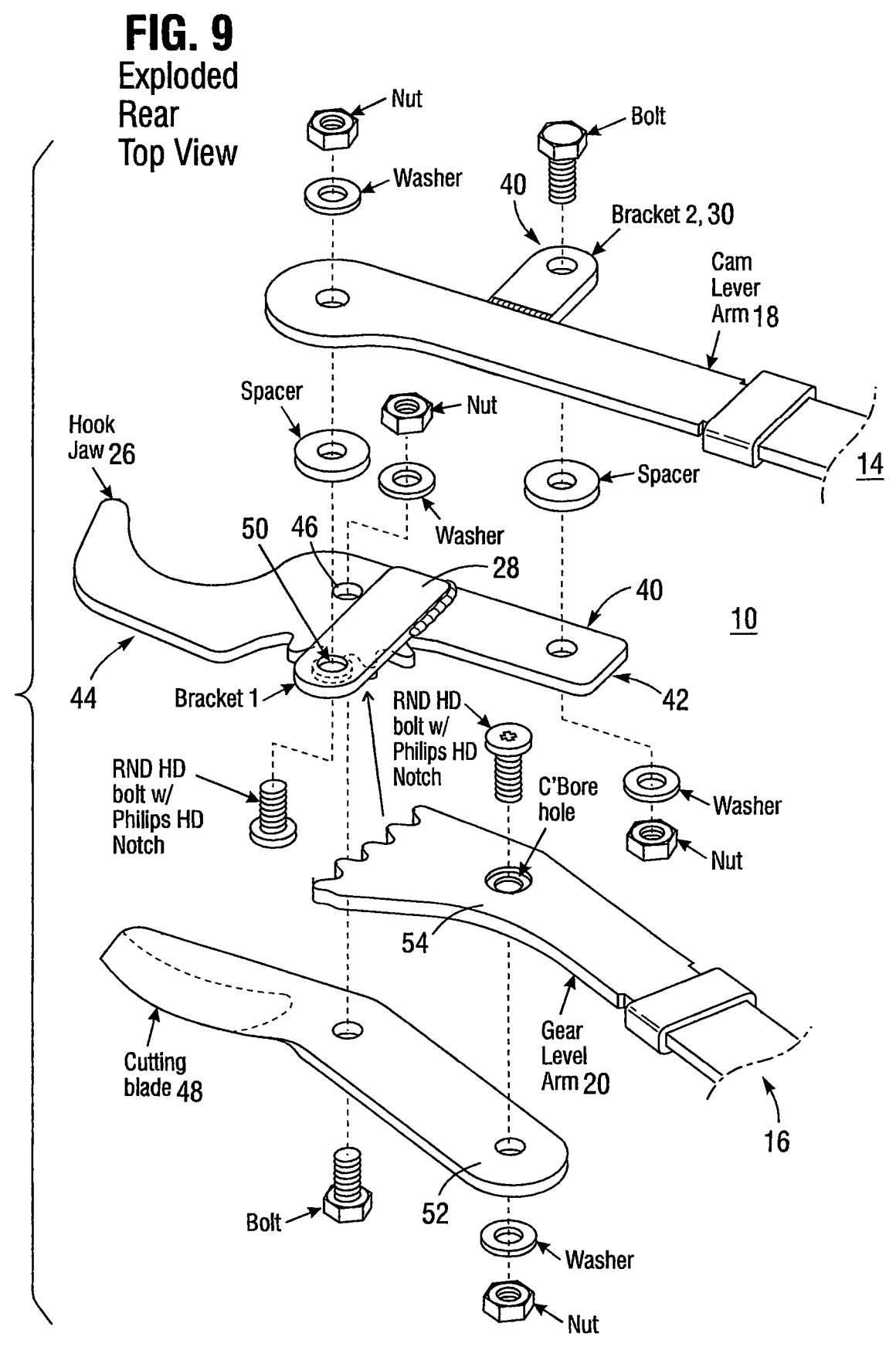

FIG. 9
Exploded
Rear
Top View

Nut

Bolt

Washer

40

Bracket 2, 30

Cam
Lever
Arm 18

14

Spacer

Nut

Hook
Jaw 26

Spacer

Washer 50   46

28

40

10

44   Bracket 1

RND HD
bolt w/
Philips HD
Notch

42

RND HD
bolt w/
Philips HD
Notch

RND HD
bolt w/
Philips HD
Notch

C'Bore
hole

Washer

Nut

54

Gear
Level
Arm 20

Cutting
blade 48

52

16

Bolt

Washer

Nut

Exploded
Rear
Bottom View

Fully Closed
Rear

Cutting blade 48

Bracket 1 28

Bracket 2 30

Cam Lever Arm

Hook Jaw 26

C'Bore hole RND HD w/ Philips notch Under Bracket 1

C'Bore hole RND HD w/ Philips notch Above Gear Level Arm

18

Gear Lever Arm

Fully Closed
Front

Hook Jaw 26

C'Bore hole RND HD w/ Philips notch

Cam Lever Arm 18

Gear Lever Arm 20

Cutting blade 48

10

Bracket 1 28

Bracket 2 30

Fully Open
Rear

Cutting blade 48

Bracket 1 28

Bracket 2 30

Hook Jaw 26

Gear Lever Arm 20

RND HD w/ Philips notch

C'Bore hole RND HD w/ Philips notch Under Side of Bracket 1

Cam Lever Arm 18

60

1/4 Open
Rear

Cutting 48 blade

Bracket 1 28

Bracket 2 30

Hook Jaw 26

Cam Lever Arm 18

C'Bore hole RND HD w/ Philips notch Under Side of Bracket 1

RND HD w/ Philips notch

Gear Lever Arm 20

60

Fully Open
Front

Gear Lever Arm

C'Bore hole RND HD w/ Philips notch

Bracket 1

Bracket 2

Cam Lever Arm

Hook Jaw

Branch

Gear

Cutting blade

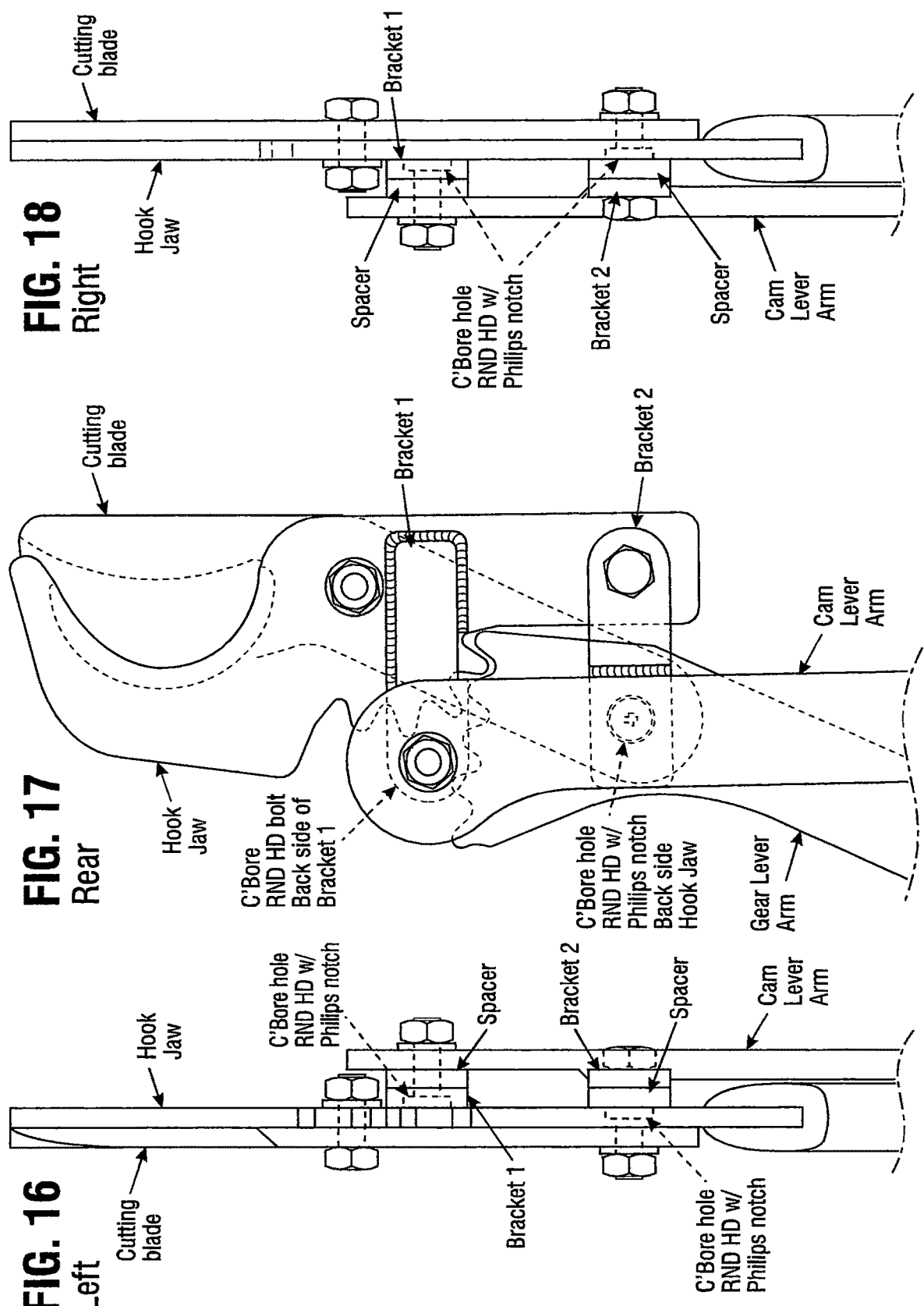

FIG. 18
Right

Cutting blade

Bracket 1

Hook Jaw

Spacer

C'Bore hole RND HD w/ Phillips notch

Bracket 2

Spacer

Cam Lever Arm

FIG. 17
Rear

Cutting blade

Bracket 1

Bracket 2

Hook Jaw

Cam Lever Arm

C'Bore RND HD bolt Back side of Bracket 1

C'Bore hole RND HD w/ Phillips notch Back side Hook Jaw

Gear Lever Arm

FIG. 16
Left

Hook Jaw

Cutting blade

C'Bore hole RND HD w/ Phillips notch

Spacer

Bracket 2

Bracket 1

Spacer

Cam Lever Arm

C'Bore hole RND HD w/ Phillips notch

Rectangular
Shaped Bracket   28          30

Alternate
Embodiment 1

L-Shaped
Bracket    28          30

Alternate
Embodiment 2

Second Preferred Embodiment Front

C'Bore hole
RND HD w/
Philips notch

C'Bore hole
RND HD w/
Philips notch
Behind Gear
Lever Arm

Gear Lever
Arm

Hook
Jaw

Bracket

Lever
Arm

Cutting
blade

Perspective
Rear

30

Bracket

C'Bore hole
RND HD w/
Philips notch

Exploded
Rear

Nut

Washer

Bolt

30

Bracket
See Fig. 29 weld all around

Spacer

Hook
Jaw

C'Bore
hole

12

Cam Lever
Arm 18

RND HD w/
Philips notch

RND HD w/
Philips notch

C'Bore
hole

Washer

Nut

Cutting
blade
48

Gear
Lever Arm 20

Washer

Washer

Nut

Right Side

Rear

Left Side

1/2 Open
Front

C'Bore hole RND HD w/ Philips notch

Washer

Nut

Gear lever Arm

Cutting blade

Hook Jaw

Bolt

Nut

Washer

Lever Arm

Bracket welded to lever arm

Weld

1/2 Open
Rear

Cutting bade 48

Bracket 30

Hook 26 Jaw

C'Bore RND HD bolt farside of Hook Jaw See Fig. 24

Gear Lever Arm 20

Cam Lever Arm 18

12

30

30

31

31

GEARED LOPPER WITH ADDITIONAL LEVERAGE

CROSS REFERENCES TO RELATED APPLICATIONS

The present application claims the benefit of provisional patent application 63/531,078, filed on Aug. 7, 2023, by Paul Janson, entitled, "GEAR LOOPER WITH ADDITIONAL DOUBLE COMPOUND LEVERAGE" MISSPELLED "LOOPER" SHOULD BE "LOPPER".

REFERENCE TO FEDERALLY SPONSORED RESEARCH OR DEVELOPMENT

NA

REFERENCE TO JOINT RESEARCH AGREEMENTS

NA

REFERENCE TO SEQUENCE LISTING

NA

BACKGROUND OF THE INVENTION

Field of the Invention

The present invention relates generally to devices for cutting branches, and, in particular, relates to manual devices for cutting, and, in greater particularity, relates to manual devices with a cutting blade for holding large branches.

Description of the Prior Art

Being able to cut large diameter branches from 1 to 2 inches requires the use of sufficient force to do it in one cut. Numerous products are available that attempt this task. Shears are not able to cut such branches since longer handles are required to develop sufficient torque and additional features may also be required.

One device shown is in U.S. Pat. No. 5,020,222 issued Jun. 4, 1991, to Gosselin et al. to "Variable Force Compound Action Leverage Tool". These are solely "hand-operated" due to the short handles and are thus limited in the diameter of branches cut. The use of arms, not just the squeezing of the fingers, to operate the cutting device is needed for larger diameter branches as well as having longer handles to transmit the torque from the longer handles to the cutting blades that are pivoted to the handles. It would be impossible to develop such torque by use of fingers and one hand to cut a large diameter branch. Devices with long handles are shown and sold by Fiskars as HD Ratchet 27", PowerGear 2", Medium Duty, 1¾ inch, Extendable Power Lever, and Light Duty 1½ inch loppers. All cited references are incorporated by reference.

Another prior art device is shown in U.S. Pat. No. 5,689,888 entitled "Variable Force Tool" by Linden that shows a long handled lopper with a pair of gears thereon.

Although the shears shown in U.S. Pat. No. 6,513,248 appear to be able to cut branches, the connecting arms as such are inoperably connected to one or more blade members as shown, in particular, in the figures would result in binding of cutting jaws due to the different levels. Attempts to cut two inch diameter branches with conventional loppers with long handles fails.

Accordingly, there is a need for a compound gear lopper having additional cutting forces available.

SUMMARY OF THE INVENTION

A geared lopper has additional compound leverage that provides additional cutting force to shear large diameter branches.

A geared lopper with additional leverage, the gear lopper comprising: a cam lever arm on an upper handle has a fixed rear bracket thereon where the fixed rear bracket is attached onto the cam lever arm and the other end has a bolt attachment point; a hook jaw has the bolt attachment point on a stub end of the hook jaw and distal from a hook jaw thereon, the hook jaw is on the front thereof. A cutting blade is connected to the hook jaw at a pivot before a front bracket and to the gear lever arm at the rear pivot of the cutting blade, spacers adjust the distance between the cam lever arm and the front pivot of the hook jaw. The geared lopper has additional leverage being able to cut large branches.

It is an object of the present invention to provide a geared lopper for cutting large branches by the use of a compound action cutting tool with additional leverage;

It is another object of the present invention to provide a lopper where the applied force is multiplied by use of a pair of brackets connected to the geared level arm and the hook jaw;

It is still a further object of the present invention to provide lopper than can easily cut 2 inch branches;

It is still another object of the present invention to provide a lopper that is easily manufactured; and It is still another object of the present invention to provide a lopper that is comparable in price to non-compound gear loppers.

These and other objects, features, and advantages of the present invention will become more readily apparent from the attached drawings and the detailed description of the preferred embodiments, which follow.

BRIEF DESCRIPTION OF THE DRAWINGS

FIG. 5 is a rear view showing the brackets on the arms there

FIG. 6 is cross-sectional view of the cam lever arm and the CUTTING BLADE;

FIG. 7 shows a cross-section view of the left side of the CUTTING BLADE;

FIG. 8 is the cross sectional showing an alternate view of FIG. 4 being the gear lever arm;

FIG. 9 is a left side view in an exploded format, rear top view;

FIG. 16 is a top view of the different pieces;

FIG. 17 shows a left side rear view;

FIG. 18 is a right side view.

Like reference numerals refer to like parts throughout the several views of the drawings.

DETAILED DESCRIPTION OF THE PREFERRED EMBODIMENTS

The variable force compound geared lopper provides additional cutting force by means of compound levers that are uniquely oriented thereon. Branches as large as 2 inches in diameter are easily cut.

Figures 1, 2:
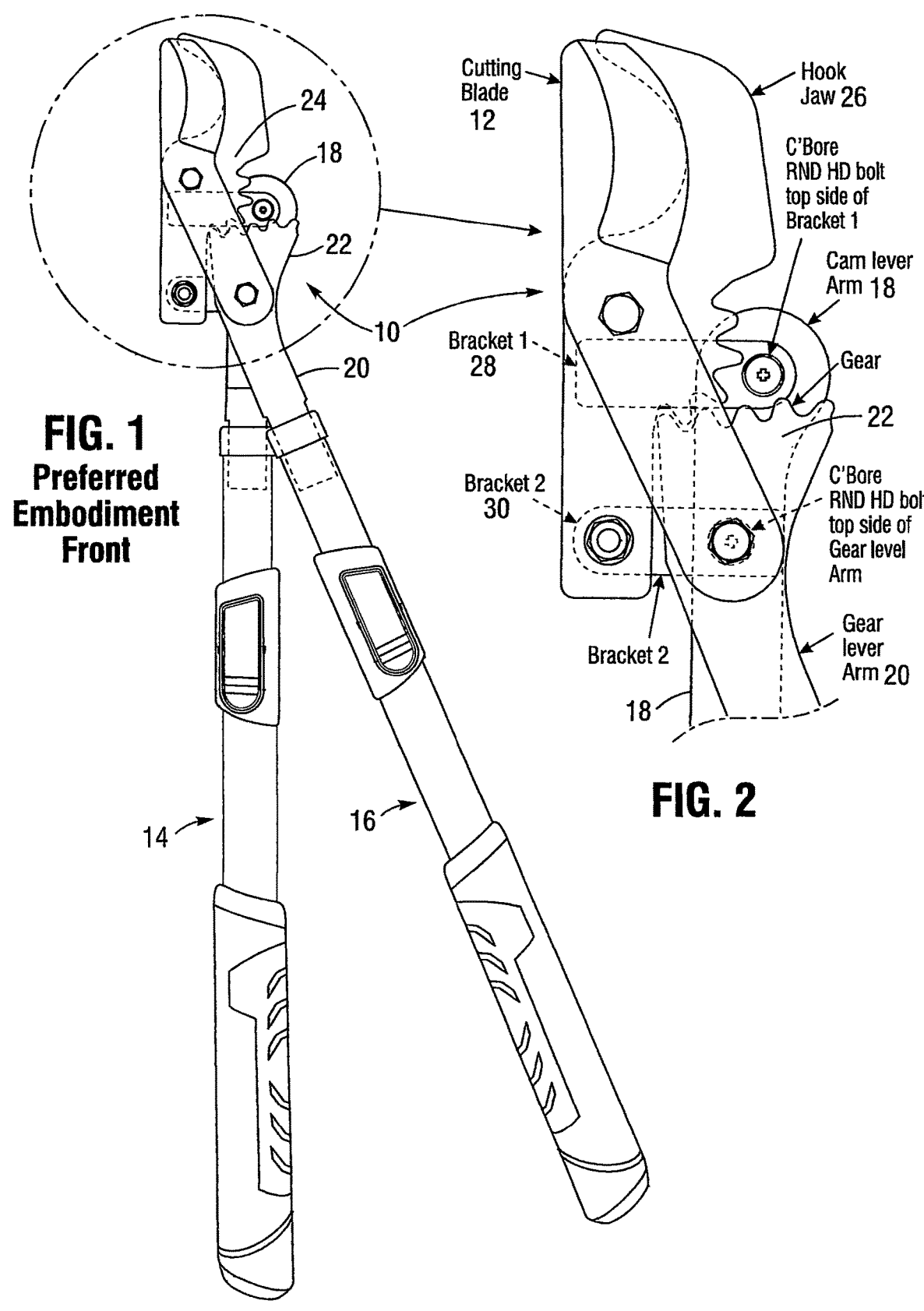
FIG. 1 is a right side view, preferred embodiment front, of the geared lopper having two brackets, in outline.
FIG. 2 is the right side view in FIG. 1, but in greater detail.

Referring to FIGS. 1 and 2, a geared lopper 10 is shown having a cutting blade 48 that is connected to long handles 14 and 16. The cutting blade 48 is connected to the hook jaw 26 and the gear lever arm 20 thereto. The gear 22 is meshed with a gear 24 on the hook jaw 26. A bracket 2, being the rear bracket 2, being item 30, is fixedly attached to the cam lever arm 18 with the bracket 1, being a front bracket 28, fixedly attached to the hook jaw 26.

Figures 3, 4:
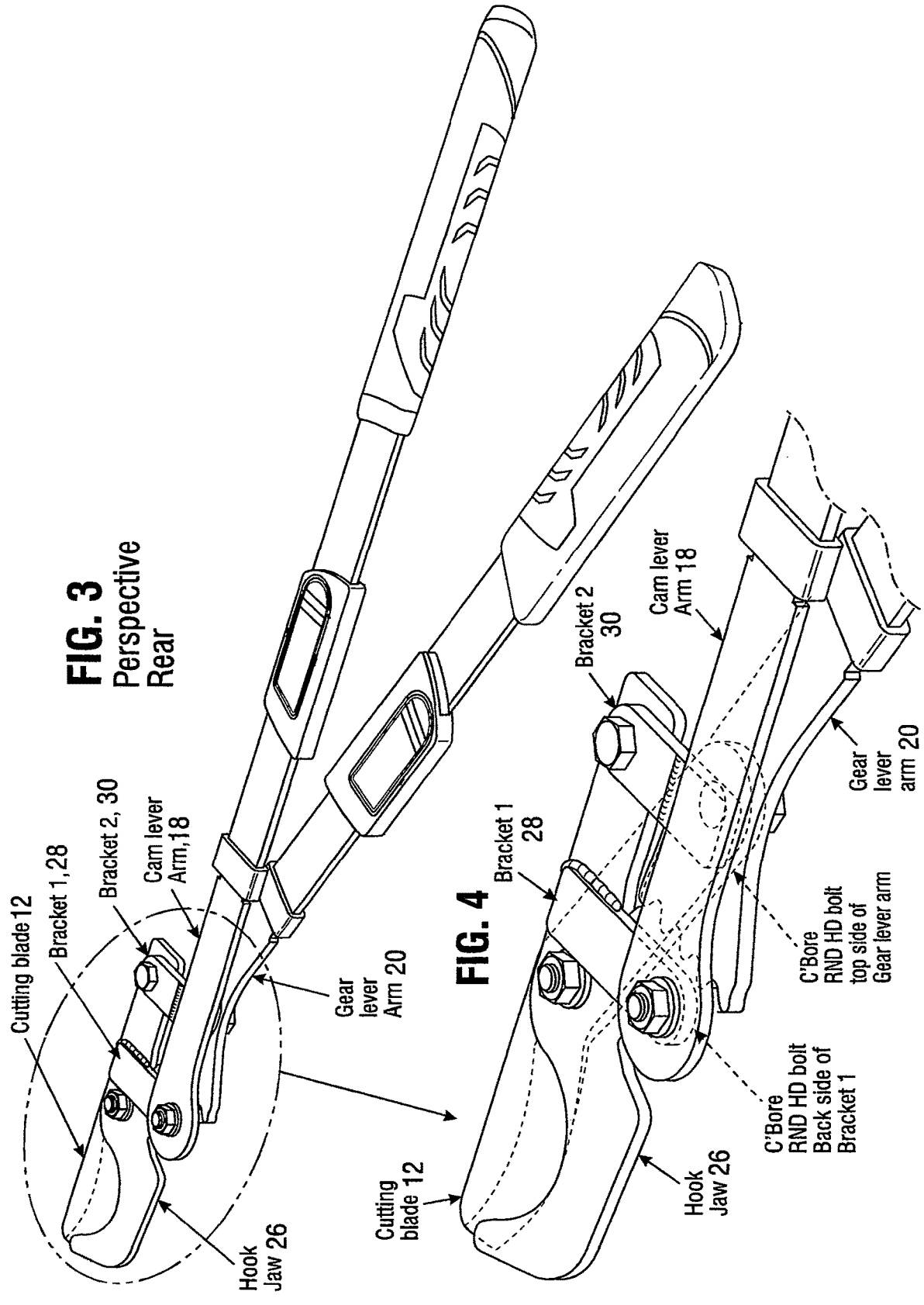
FIG. 3 shows the geared lopper, left side perspective rear view.
FIG. 4 is a greater detailed view of FIG. 3.

FIG. 2 is a perspective view of the cutting blade 48 FIG. 4 being in greater detail. Referring to the rear bracket 2, or item 30, it is effectively mounted to the cam lever arm 18 in a perpendicular manner to the longitudinal axis of the cam lever arm 18. It is welded to the cam lever arm 18. By use of these brackets, they effectively increase the torque applied to the work piece in the hook jaw 26. The bracket 30 is bolted to the hook jaw 26 on the distal end of the hook jaw 26. The bracket 28, also noted as bracket 1, is also perpendicularly mounted to the hook jaw 26 there being a longitudinal axis therein. It also can be welded thereto and bolted by pivot to the pivot in the front of the front bracket 28.

FIG. 3 is like FIG. 2. FIG. 5 is a rear view with cross-sectional views noted as 6 and 7 as shown by the numbers in FIG. 5. FIGS. 6 and 7 and 8 are views with the different layers described in relation to FIG. 5.

Referring to FIG. 9 being an exploded rear top view of the geared lopper 10. Nuts, bolts, washers and spacers are shown but not further described as being conventional. The cam lever arm 18 on an upper handle 14 has a fixed rear bracket 30 thereon where the fixed rear bracket 30 is attached onto the cam lever arm 18 by welding and the other end has a bolt attachment point 40; the hook jaw 26 has the bolt attachment point 40 on a stub end 42 of the hook jaw 26 and distal from a hook jaw 26 thereon, said hook jaw 26 is on the front end 44 of such, a front bracket 28 is attached thereon near the hook jaw 26 with a pivot 46 between the hook jaw 26 and the front bracket 28, spacers adjust the distance between the cam lever arm 18. A cutting blade 48 is attached to the hook jaw 26 before a front bracket 28 in a pivot 46, a rear pivot 52 on the cutting blade attaches to an only pivot 54 on the gear lever arm 20.

This preferred embodiment is able to out perform other devices since the handle is connected up front and below the cutting blade and that puts a new fulcrum in a stronger position below the cutting blade axis and to the gear train. By doing this, the work when placed in the jaw, the fulcrum acts as a prying force on the back end of the hooked jaw when the handle is attached behind the cutting blade axis.

Figure 10:
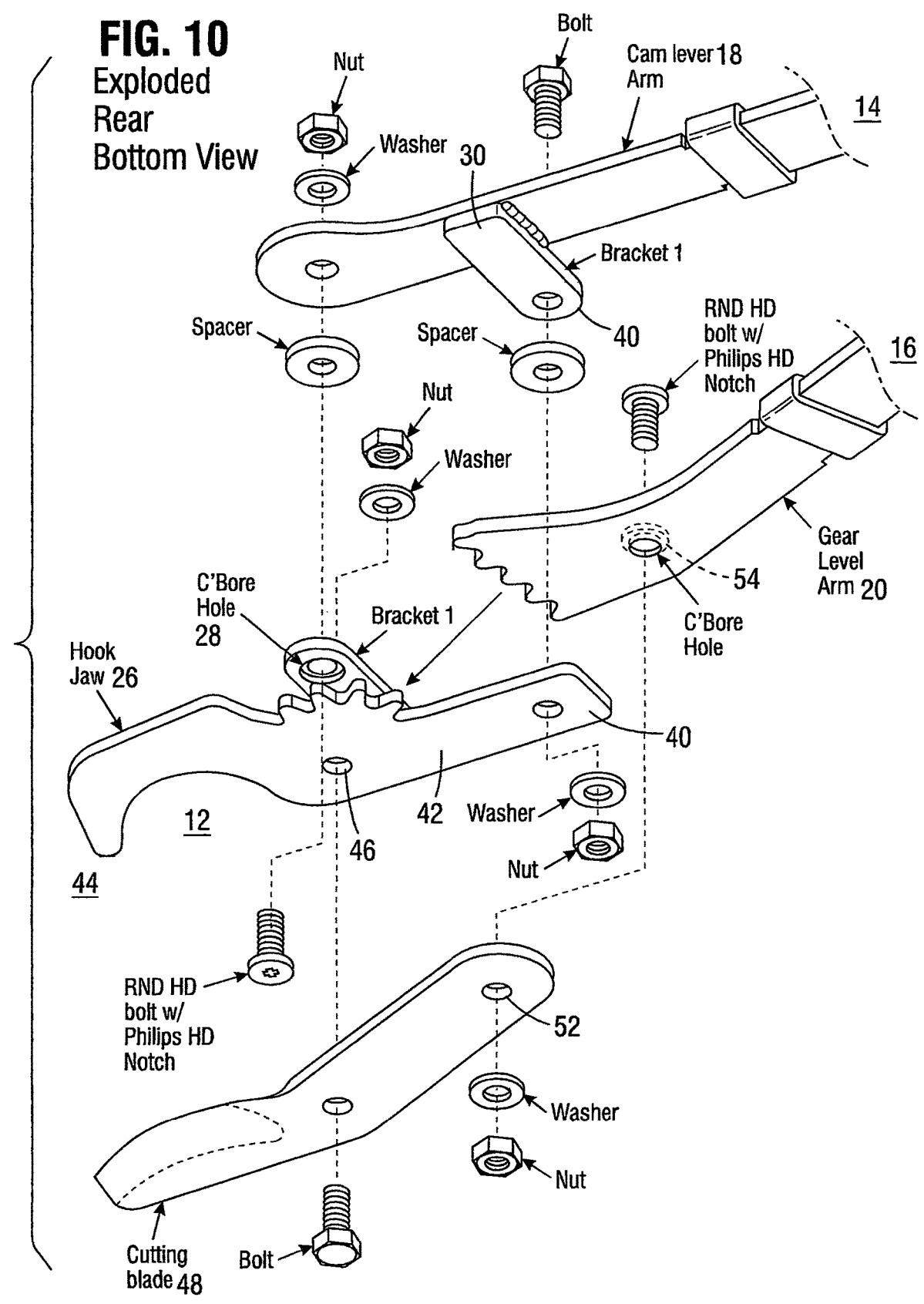
FIG. 10 is the same as FIG. 9 except being the other side, an exploded rear bottom view.

In light of the FIG. 9, FIG. 10 shows the exploded rear bottom view to further understanding. See the above paragraph since the numbering of the items is similar.

Figures 11, 12:
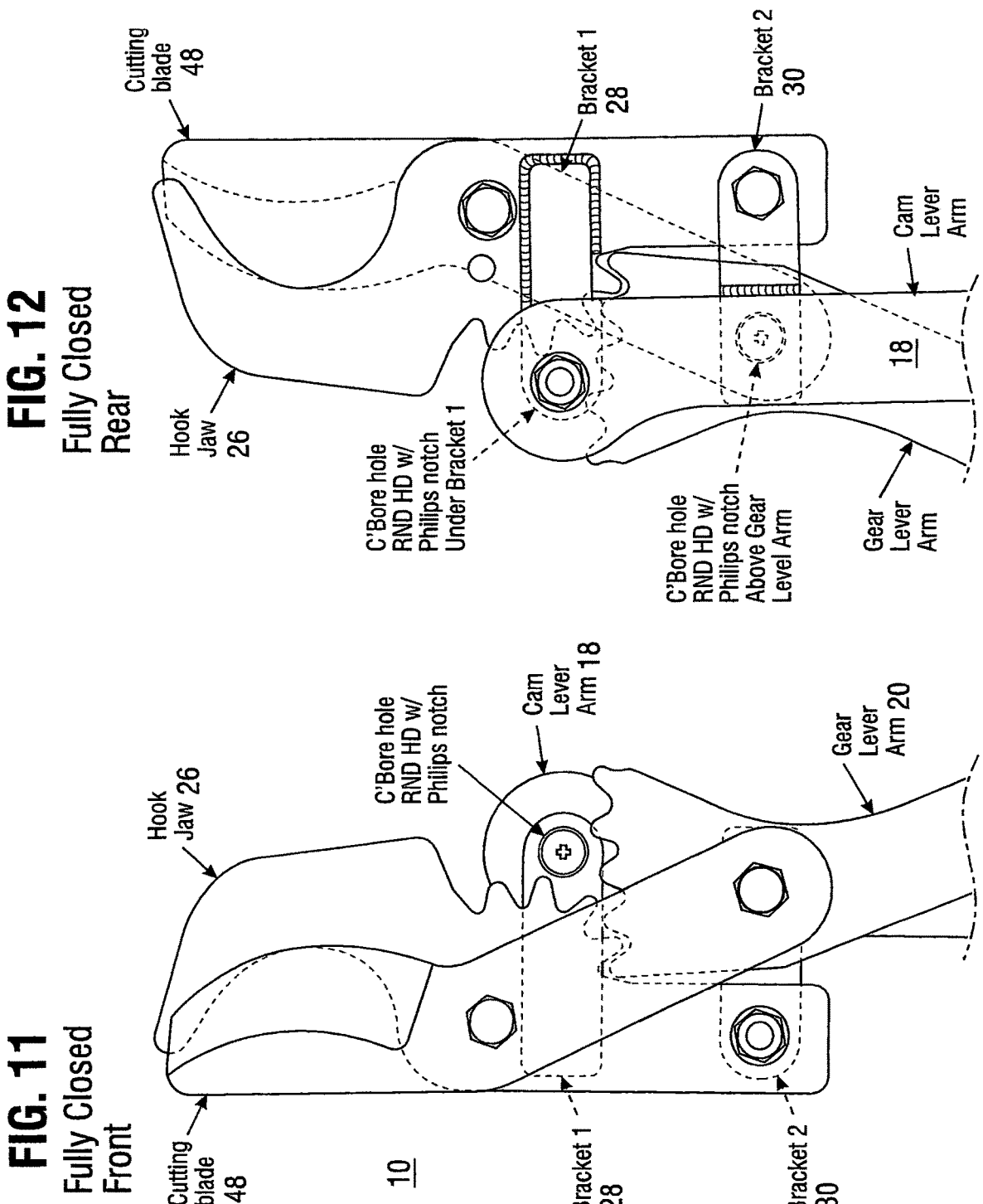
FIG. 11 is a left side view of the cutting blade in a fully closed front position.
FIG. 12 is a fully closed rear view.
Figures 13, 14:
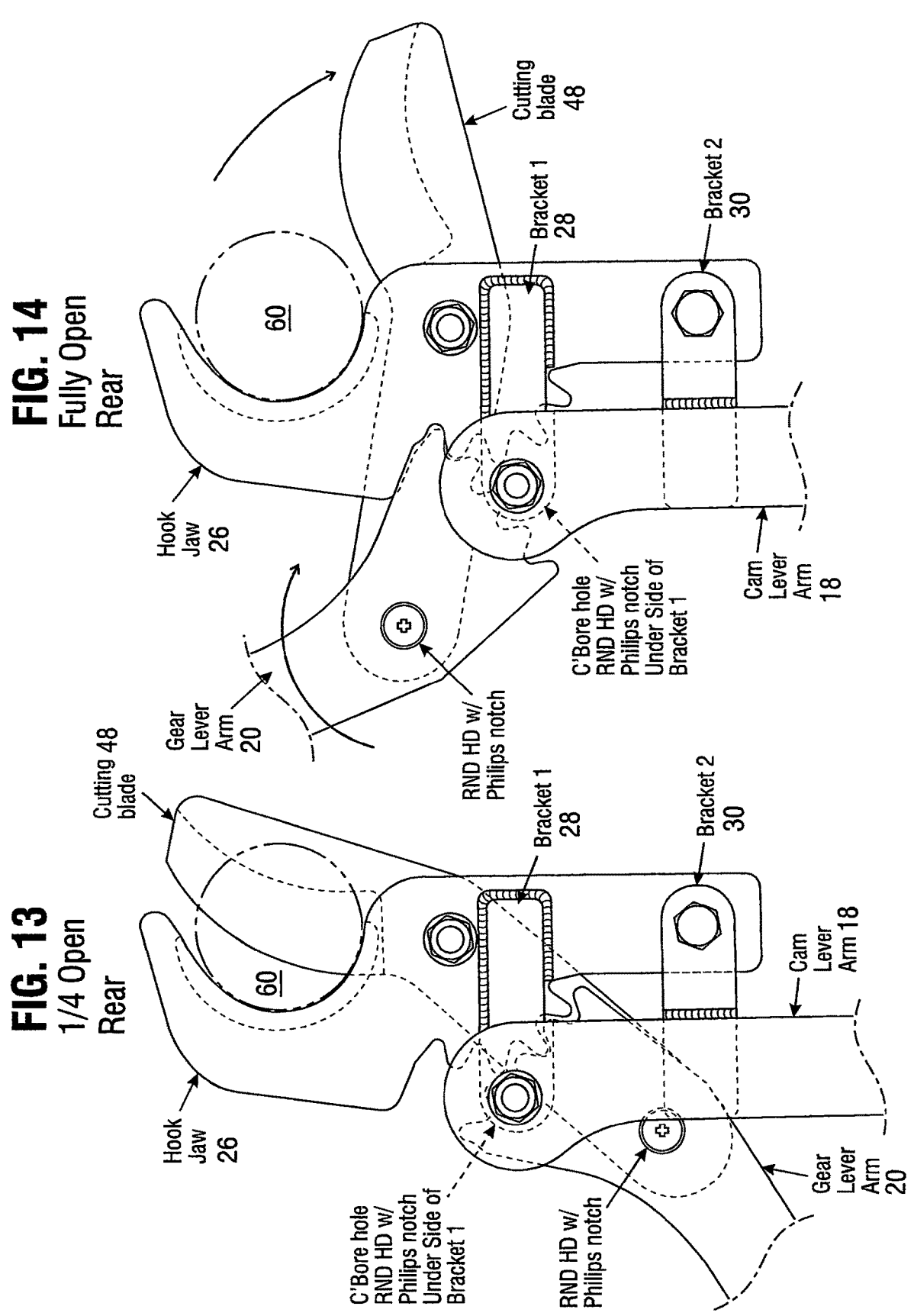
FIG. 13 shows the cutting blade with a large branch therein.
FIG. 14 is the same view of FIG. 13 but being fully open and further with a large branch therein.

FIG. 11 shows the geared lopper 10 in a fully closed front view position. The gear lever arm 20 is connected to the cutting blade 48 with FIG. 12 showing the opposite side. FIG. 13 is a fully open front view with the branch therein.

Figure 15:
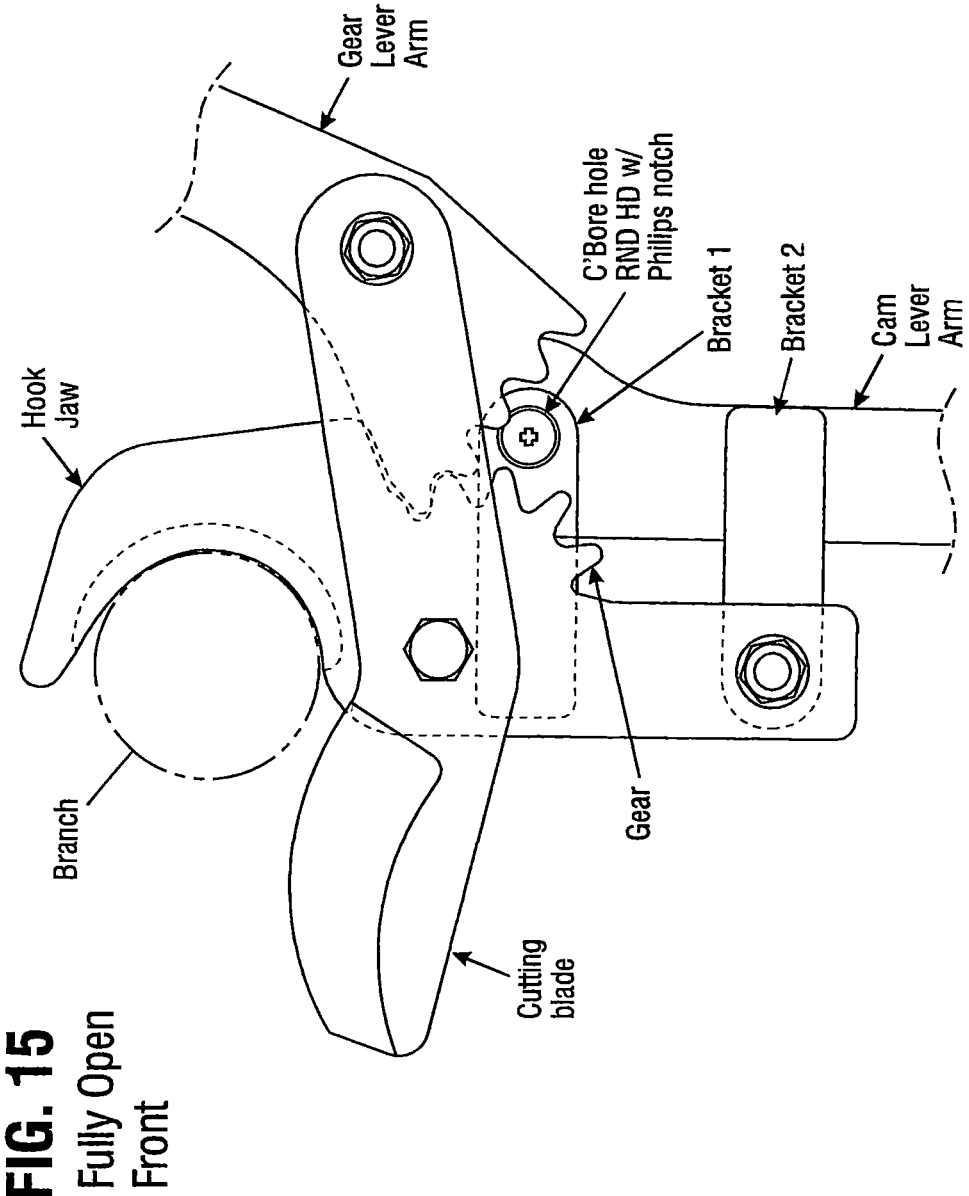
FIG. 15 is a left side view in a fully open front.

FIG. 13 shows the FIG. 12 open with a branch 60 therein and FIGS. 14 and 15 is fully open with a branch 60 therein.

FIGS. 16, 17, and 18 show the lopper in a rear view and FIGS. 16 and 18, in a left top view and a right bottom view respectively.

Figures 19, 20, 21:
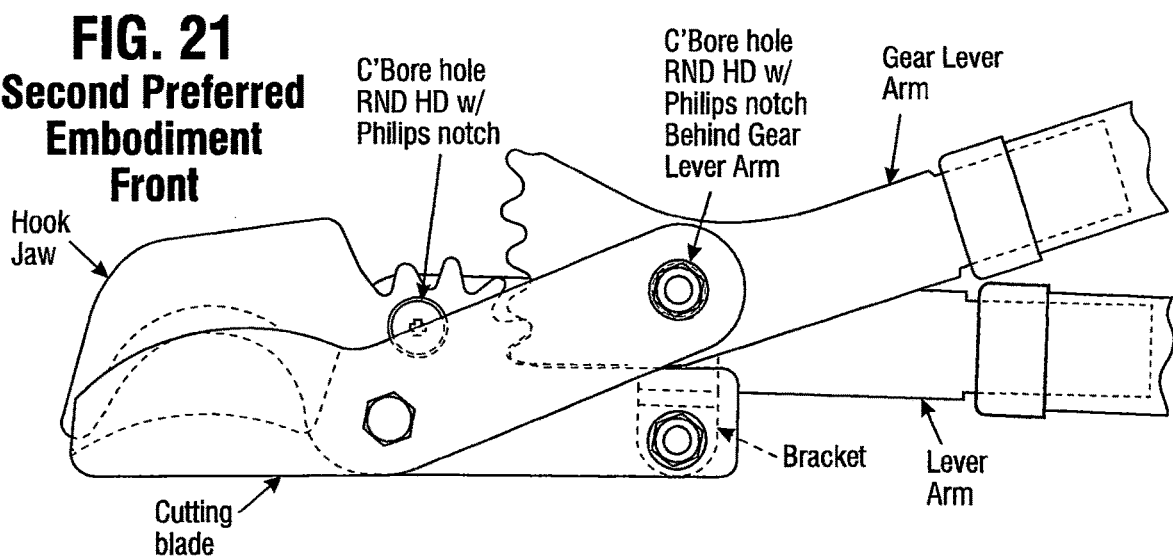
FIG. 19 shows an alternate embodiment with a different shaped front bracket.
FIG. 20 shows an alternative embodiment of the front bracket being L-shaped.
FIG. 21 show the one bracket version in different views
Figures 22, 23:
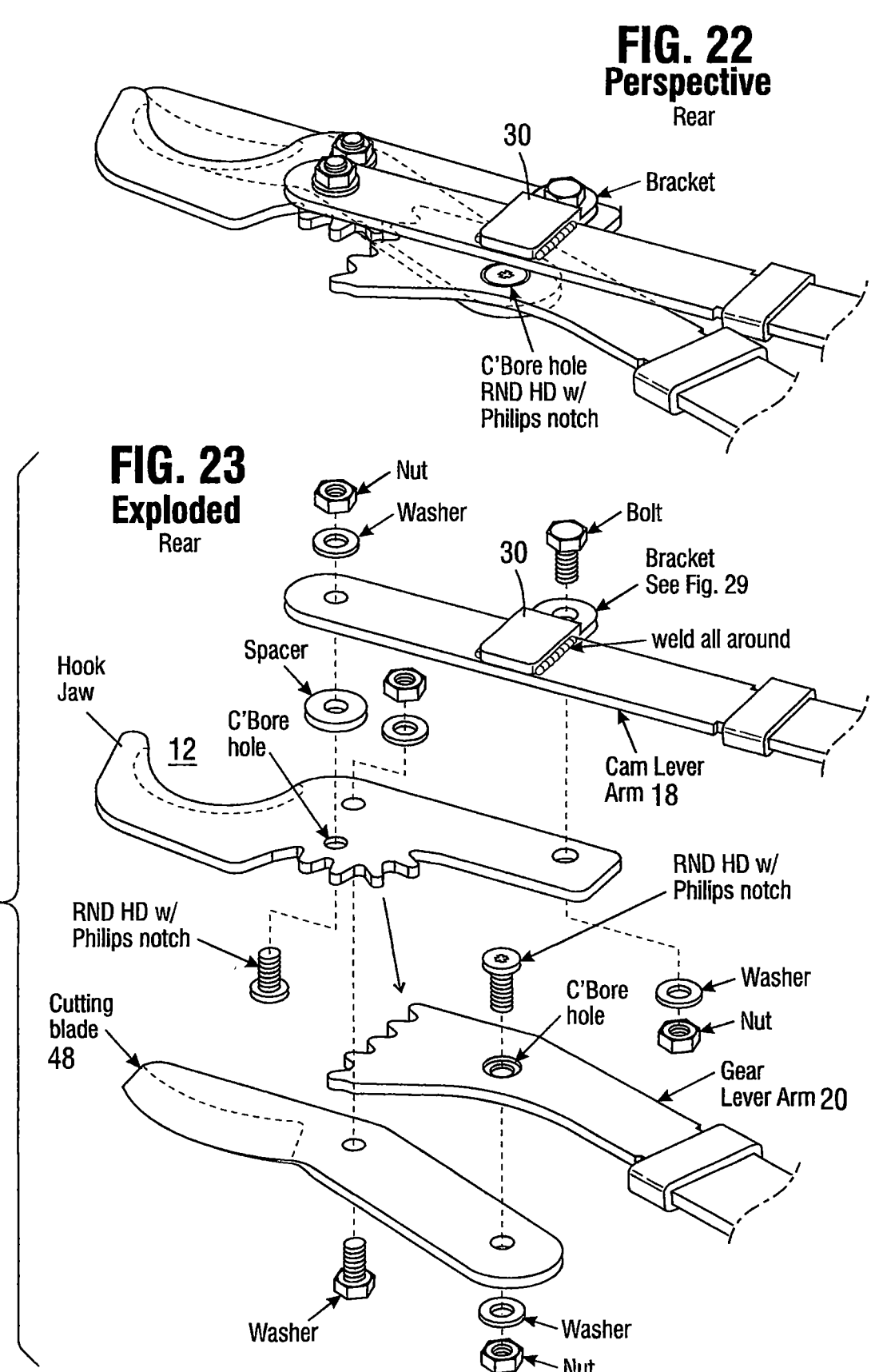
FIGS. 22, 23, 24 and 25 show additional details of the one bracket version, FIG. 23 being an exploded rear view.
Figures 24, 25, 26, 27:
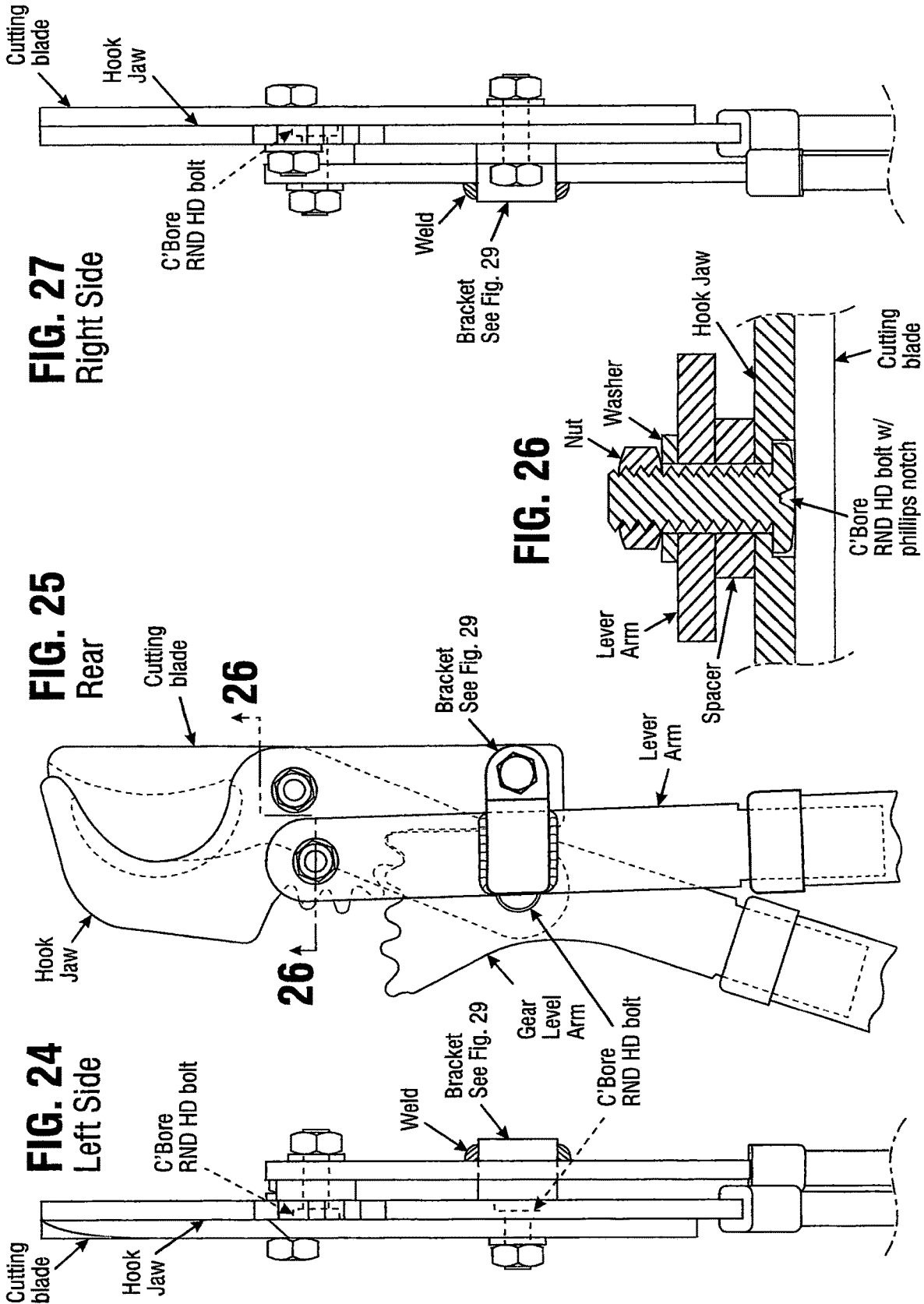
FIG. 26 shows the one bracket version in cross section noted as 26 in FIG. 25.
FIGS. 27, 28, and 29 show additional views of a one bracket version.
Figure 28:
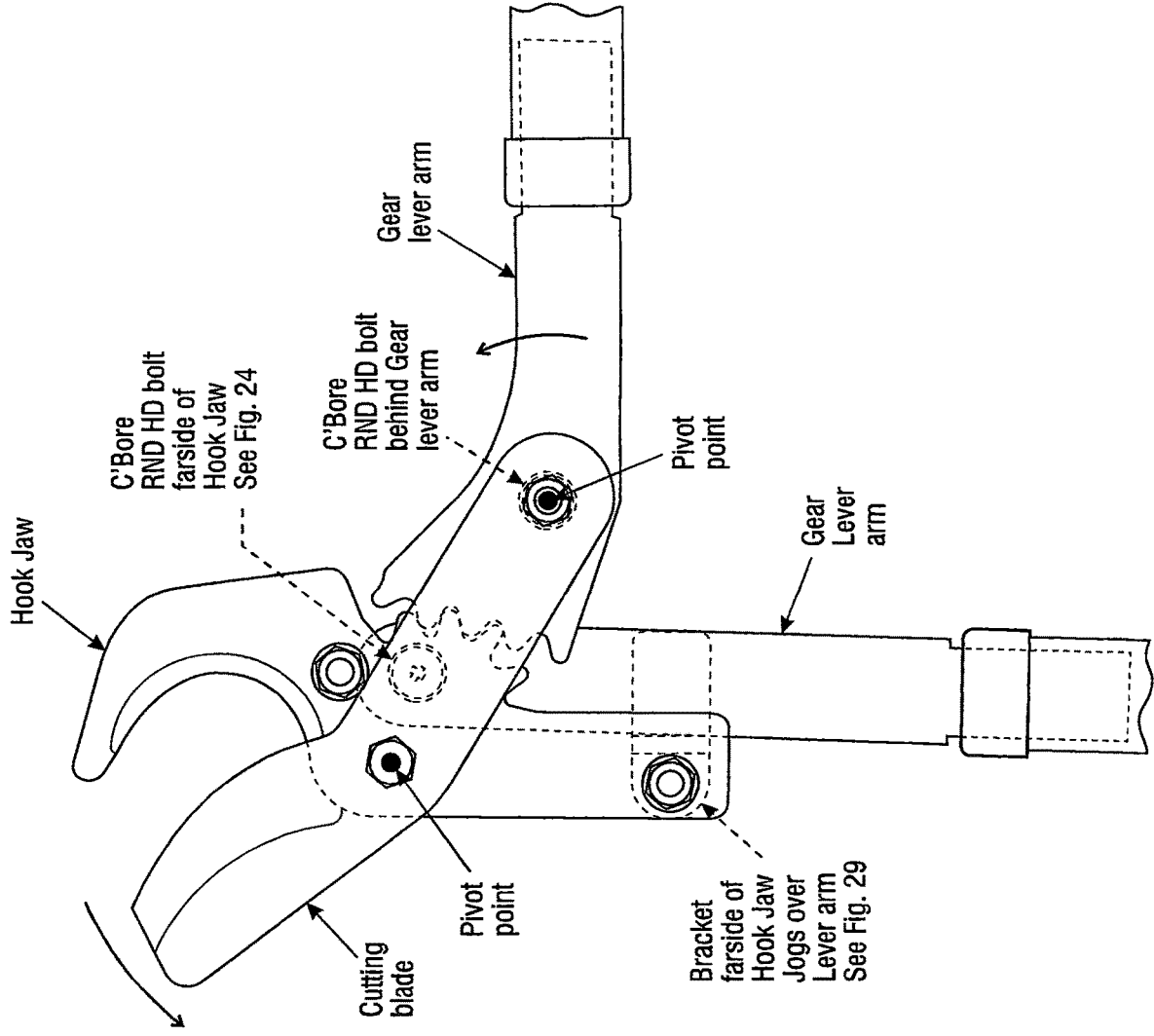
Figures 29, 30, 31:
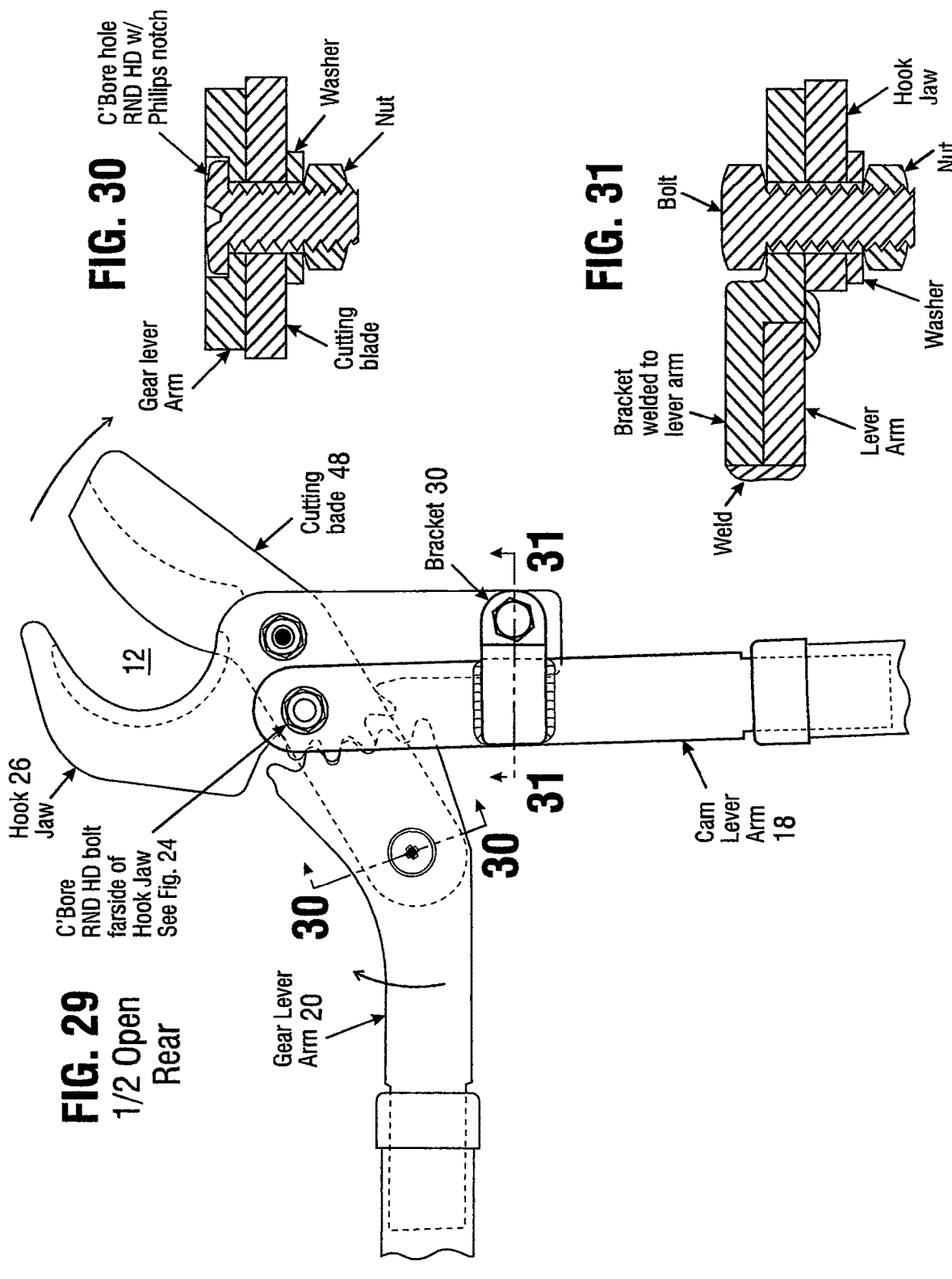
FIGS. 30 AND 31 show cross sections as indicated in FIG. 29.

FIGS. 19 and 20 show the front bracket having different shapes as alternate embodiments, the front bracket being mounted to the hook jaw 26 perpendicular to the axis noted thereon.

FIGS. 21 to 27 show a version of the geared lopper having only one rear bracket, said rear bracket being rectangular in shape and mounted perpendicular to a long axis of the cam lever arm.

In summary, a geared lopper with additional leverage is able to cut large branches having a cam lever arm on an upper handle with a fixed rear bracket thereon where the fixed rear bracket is attached onto the cam lever arm and the other end has a bolt attachment point; a hook jaw has the bolt attachment point on a stub end of the hook jaw and distal from a hook jaw thereon, said hook jaw is on the front end, a front bracket is attached thereon near the hook jaw with a pivot between the hook jaw and the front bracket, spacers adjust the distance between the cam lever arm and the hook jaw; a cutting blade has a front pivot that attaches onto the front pivot of the hook jaw, a rear pivot on the cutting blade attaches to the only pivot on the gear lever arm; and a gear lever arm on a lower handle, the rear pivot on the cutting blade attaches to the only pivot on the gear lever arm. The cam lever arm has a rear bracket and the hook jaw has a front bracket that are fixedly attached thereon. The brackets are welded thereon and are essentially perpendicular to the cam lever arm and the hook jaw. The upper and the lower handles are elongated handles and have a length of about 20 to 30 inches and are adjustable in length. The front bracket has rectangular shape or an L-shaped bracket, but other shapes may be acceptable.

Another embodiment of the geared lopper with additional leverage being able to cut large branches has a cam lever arm on an upper handle with a fixed rear bracket thereon where the fixed rear bracket is attached onto the cam lever arm and the other end has a bolt attachment point; a hook jaw has the bolt attachment point on a stub end of the hook jaw and distal from a hook jaw thereon; a cutting blade is attached to a pivot on the hook jaw, a rear pivot on the cutting blade attaches to the only pivot on the gear lever arm; and a gear lever arm on a lower handle, the rear pivot on the cutting blade attaches to the only pivot on the gear lever arm. The geared lopper has the rear bracket fixedly attached thereon by welding. The geared lopper has an upper and a lower handles that are elongated handles and have a length of about 20 to 30 inches and are adjustable in length. The embodiment of the geared lopper has only one bracket, the rear bracket.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A geared lopper with additional leverage being able to cut large branches, said gear lopper comprising:

a cam lever arm on an upper handle has a fixed rear bracket thereon where the fixedly rear bracket is attached onto the cam lever arm and the other end has a bolt attachment point;

a hook jaw has the bolt attachment point on a stub end of the hook jaw and distal from a hook jaw thereon, said hook jaw being on the front end, a front bracket is attached thereon near the hook jaw with a pivot between the hook jaw and the front bracket, spacers adjust the distance between the cam lever arm and the hook jaw;

a cutting blade, said cutting blade having a front pivot that attaches onto the front pivot of the hook jaw, a rear pivot on the cutting blade attached to the only pivot on the gear lever arm; and a gear lever arm on a lower handle, the rear pivot on the cutting blade attaches to the only pivot on the gear lever arm.

2. The geared lopper as defined in claim 1, wherein the rear and front brackets are fixedly attached thereon, the rear bracket to the cam lever arm and the front bracket to the hook jaw.

3. The geared lopper as defined in claim 2, wherein the brackets are welded thereon and are essentially perpendicular to the cam lever arm and the hook jaw.

4. The geared lopper as defined in claim 1, wherein said upper and said lower handles are elongated handles and have a length of about 20 to 30 inches and are adjustable in length.

5. The geared lopper as defined in claim 1, wherein said front bracket has rectangular shape or an L-shaped bracket.

6. A geared lopper with additional leverage being able to cut large branches, said gear lopper comprising:

a cam lever arm on an upper handle has a fixed rear bracket thereon where the fixed rear bracket is attached onto the cam lever arm and the other end with a bolt attachment point;

a hook jaw has the bolt attachment point on a stub end of the hook jaw and distal from a hook jaw thereon;

a cutting blade is attached to a pivot on the hook jaw, a rear pivot on the cutting blade attaches to an only pivot on said gear lever arm; and a gear lever arm on a lower handle, the rear pivot on the cutting blade attaches to the only pivot on the gear lever arm.

7. The geared lopper as defined in claim 6, wherein the rear bracket is fixedly attached thereon.

8. The geared lopper as defined in claim 7, wherein the bracket is welded thereon.

9. The geared lopper as defined in claim 6, wherein said upper and said lower handles are elongated handles and have a length of about 20 to 30 inches and adjustable in length.

10. The geared lopper as defined in claim 6 wherein there is only one bracket, said rear bracket.

* * * * *